(12) United States Patent
Chen

(10) Patent No.: US 11,283,781 B2
(45) Date of Patent: Mar. 22, 2022

(54) PROXIMITY INTERACTION SYSTEM INCLUDING SECURE ENCRYPTION SCHEME

(71) Applicant: Visa International Service Association, San Francisco, CA (US)

(72) Inventor: Yuexi Chen, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 58 days.

(21) Appl. No.: 16/842,551

(22) Filed: Apr. 7, 2020

(65) Prior Publication Data

US 2020/0329014 A1 Oct. 15, 2020

Related U.S. Application Data

(60) Provisional application No. 62/831,602, filed on Apr. 9, 2019.

(51) Int. Cl.
| | |
|---|---|
| *H04L 29/06* | (2006.01) |
| *H04L 9/08* | (2006.01) |
| *H04L 9/06* | (2006.01) |
| *H04L 9/32* | (2006.01) |
| *G06Q 20/40* | (2012.01) |
| *H04B 11/00* | (2006.01) |
| *H04L 67/01* | (2022.01) |

(52) U.S. Cl.
CPC ....... *H04L 63/045* (2013.01); *G06Q 20/4018* (2013.01); *H04B 11/00* (2013.01); *H04L 9/0631* (2013.01); *H04L 9/0866* (2013.01); *H04L 9/3213* (2013.01); *H04L 67/42* (2013.01)

(58) Field of Classification Search
CPC .. H04B 11/00; G06Q 20/322; G06Q 20/3823; G06Q 20/3272; G06Q 20/3821; G06Q 20/4018; H04L 9/3213; H04L 9/0866; H04L 9/0631; H04L 63/0492; H04L 63/045; H04L 63/0876; H04L 63/0428; H04L 67/42; H04L 63/0414
See application file for complete search history.

(56) References Cited

U.S. PATENT DOCUMENTS 9,991,970 B2 6/2018 Ansell
2015/0163336 A1 6/2015 Ramos et al.
(Continued)

FOREIGN PATENT DOCUMENTS

WO 2017135537 8/2017

OTHER PUBLICATIONS

Application No. EP20168845.4, Extended European Search Report, dated Aug. 17, 2020, 12 pages.

*Primary Examiner* — Mohammad A Siddiqi
(74) *Attorney, Agent, or Firm* — Kilpatrick Townsend & Stockton LLP

(57) ABSTRACT

A method is disclosed for conducting a transaction between a computing device and an access device. A server computer may be utilized to facilitate data exchanges between the computing device and the access device. These data exchanges may utilize high-frequency sound signals. The server computer may encrypt at least some portion of data that is then transmitted to the access device via the computing device. The server computer may verify data received from the access device prior to generating and transmitting an authorization request message for the transaction.

19 Claims, 4 Drawing Sheets

(56) References Cited

U.S. PATENT DOCUMENTS

| | | | |
|---|---|---|---|
| 2015/0339767 A1* | 11/2015 | Chen | G06Q 20/22 |
| | | | 705/39 |
| 2016/0261411 A1* | 9/2016 | Yau | H04L 63/0492 |
| 2016/0277380 A1 | 9/2016 | Wagner et al. | |
| 2017/0250859 A1* | 8/2017 | Gheorghe | H04L 41/0803 |
| 2018/0006821 A1 | 1/2018 | Kinagi | |
| 2018/0026973 A1 | 1/2018 | Le Saint et al. | |
| 2018/0083929 A1* | 3/2018 | Roth | H04L 63/0435 |
| 2019/0098016 A1* | 3/2019 | Jeon | H04L 9/3263 |
| 2020/0126058 A1* | 4/2020 | Mars | G06Q 20/3821 |

\* cited by examiner

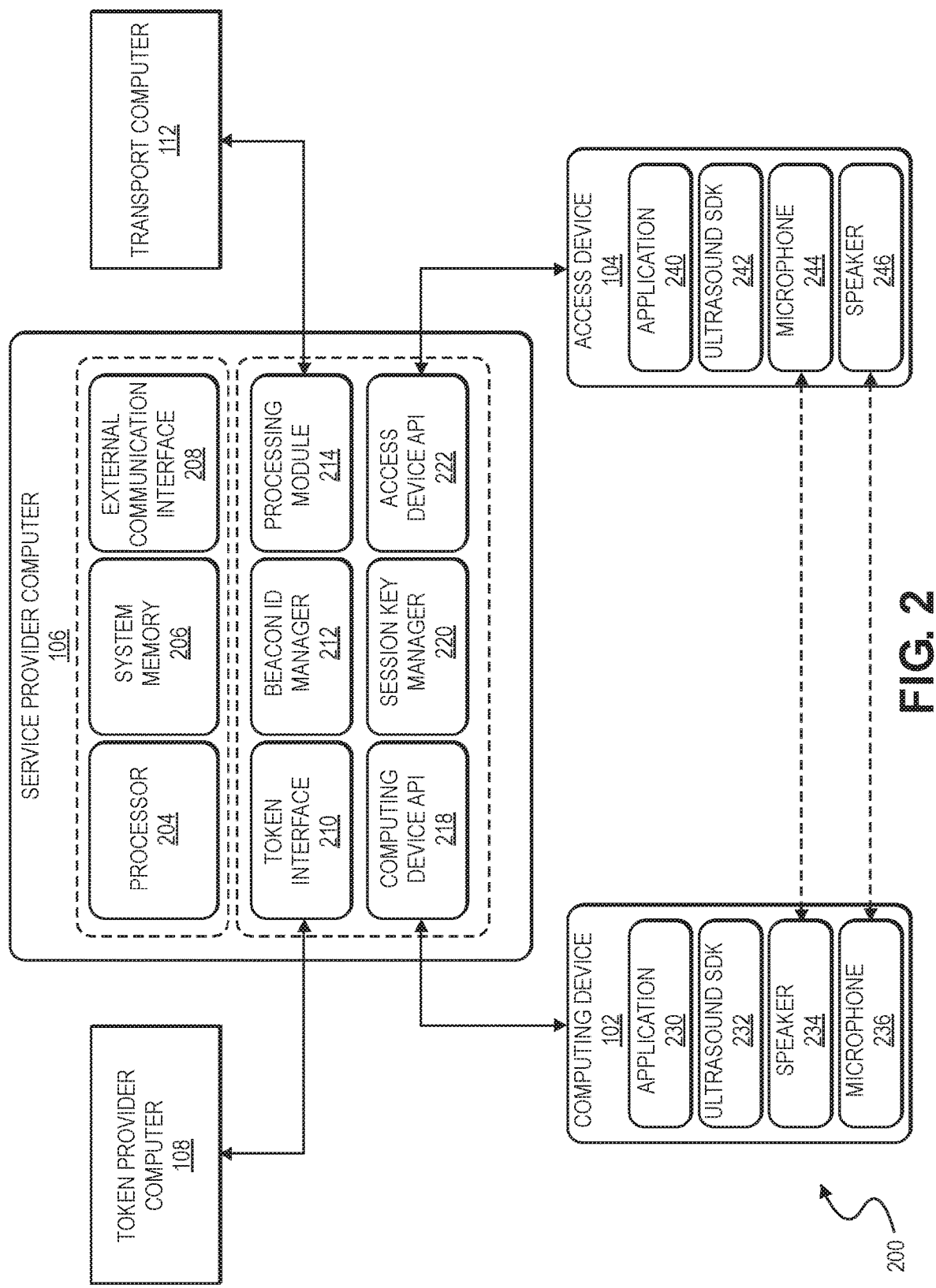

PROXIMITY INTERACTION SYSTEM INCLUDING SECURE ENCRYPTION SCHEME

CROSS-REFERENCE TO RELATED APPLICATIONS

This application is a non-provisional of U.S. provisional patent application No. 62/831,602, filed on Apr. 9, 2019, which is herein incorporated by reference in its entirety for all purposes.

BACKGROUND

The use of non-audible high frequency sound to exchange data between devices has recently been developed. Such data on sound (DoS) technology has certain advantages. By way of example, exchanging data via sound likely requires no additional hardware and the sound is transmitted over a finite distance which can be advantageous depending on the context in which it is used.

Meanwhile, there are certain limitations on the DoS technology. For example, non-audible high frequency sound is currently half duplex only, which means that data can be transmitted in both directions on a signal carrier, but no two transmission can occur at the same time. Additionally, the context of sound utilization to exchange data inherently includes difficulties in maintaining a session, which is common with interactions that occur via RF type data communication protocols such as Bluetooth or NFC (near field communications). Further, current DoS technology has limited, if any, data security. Still further, the DoS technology includes low bandwidth (<1000 bps) and long latency when switching between sending and receiving. These limitations make data exchanges via sound problematic for utilization in contexts in which speed and data security are factors.

Embodiments of the invention address these and other problems individually and collectively.

BRIEF SUMMARY

One embodiment of the invention is directed to a method receiving, by a server computer from a computing device, first data comprising at least a unique identifier associated with an access device in a transaction; verifying, by the server computer, the first data utilizing the received unique identifier; generating a session key; generating encrypted data utilizing the session key; transmitting second data comprising the encrypted data to the computing device; receiving, from the access device, third data comprising the encrypted data; generating decrypted data utilizing the encrypted data and the session key; verifying the decrypted data; and in response to verifying the decrypted data, transmitting an authorization request message for the transaction comprising at least some portion of the third data and the decrypted data.

Another embodiment of the invention is directed to a method comprising: receiving, by a server computer from a computing device, first data comprising at least a unique identifier associated with an access device, the first data being associated with a transaction being conducted between the computing device and the access device; verifying, by the server computer, the first data utilizing the unique identifier received; in response to verifying the first data, transmitting second data to the computing device, wherein receipt of the second data by the computing device causes the computing device to transmit the second data to the access device; receiving, from the access device, third data; verifying the third data at the server computer; and when the third data is verified, transmitting, by the server computer, an authorization request message for the transaction.

Another embodiment of the invention is directed to server computer comprising a processor, and a non-transitory computer readable medium comprising code executable by the processor for performing the above methods.

Another embodiment of the invention is directed to another method comprising receiving, at a computing device from an access device, initial data including a unique identifier associated with the access device, the initial data being transmitted by the access device to the computing device using high-frequency sound signals generated by the access device; transmitting, by the computing device to a server computer, first data comprising the unique identifier; in response to transmitting the first data, receiving, by the computing device from the server computer, second data; transmitting, by the computing device to the access device, at least a portion of the second data to the access device using high-frequency sound signals generated by the computing device; and receiving, by the computing device, an indication that the transaction was approved or denied.

Another embodiment of the invention is directed to a computing device comprising a processor, and a non-transitory computer readable medium comprising code executable by the processor for performing the above method.

Further details regarding embodiments of the invention can be found in the Detailed Description and the Figures.

BRIEF DESCRIPTION OF THE DRAWINGS

FIG. 2 illustrates a block diagram of a transaction system, in accordance with at least one embodiment.

DETAILED DESCRIPTION

Figure 1:
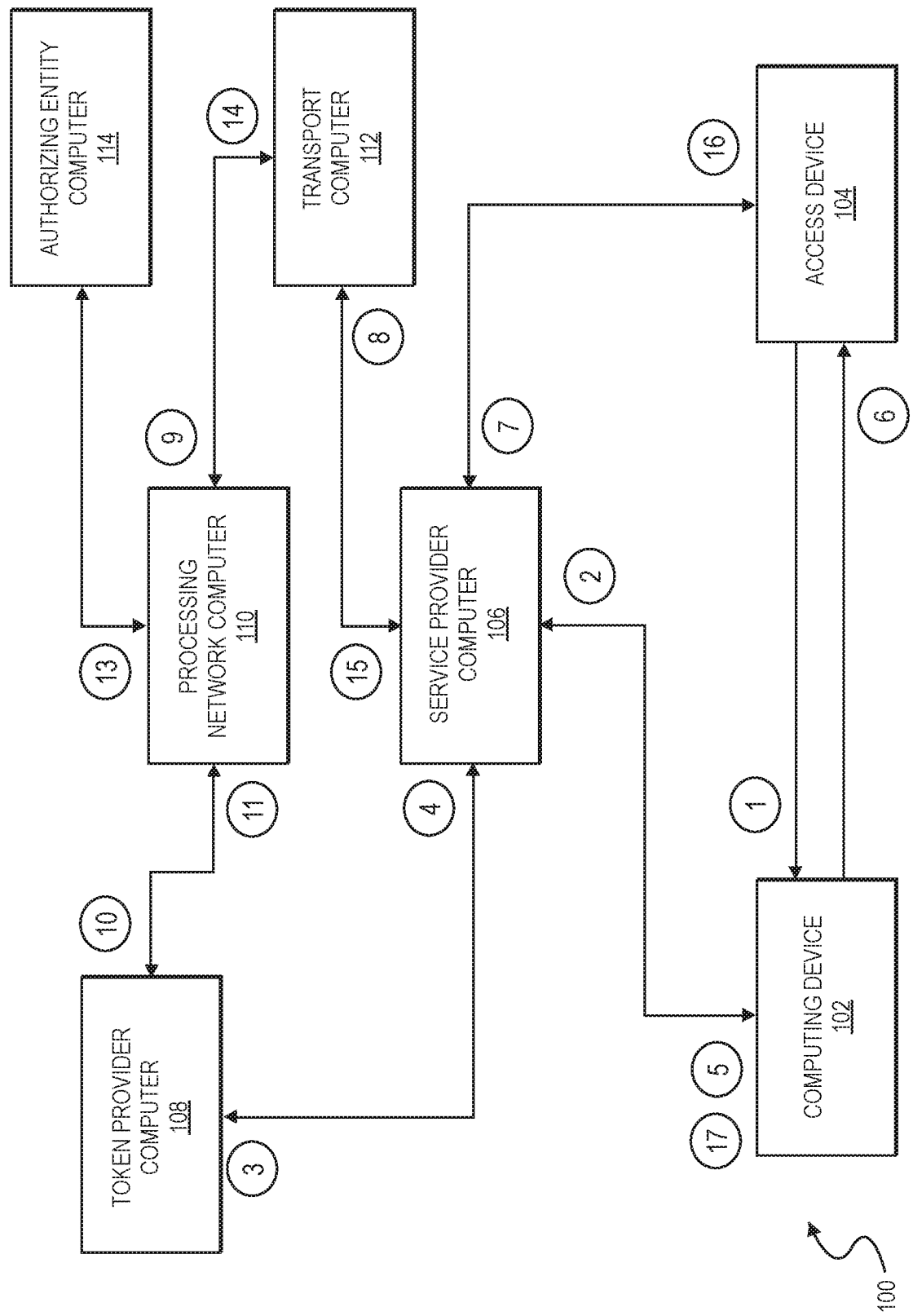
FIG. 1 shows a block diagram of a system and method for performing a transaction utilizing a stateless and session-less protocol, in accordance with at least one embodiment.

Prior to discussing embodiments of the invention, some terms can be described in further detail.

A "computing device" may comprise any suitable device that may be used to transmit and/or receive data. Examples of computing devices may include mobile communication devices (e.g., mobile phones), payment devices (e.g., credit cards, debit cards, etc.), user access devices such as access badges, etc. A computing device can store sensitive information such as payment credentials (e.g., primary account numbers, tokens, expiration dates, etc.), and access credentials. In some embodiments, a computing device can include one or more input/output devices such as a microphone, a display, a speaker, and the like.

A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction). Mobile communication devices may also include vehicles such as cars that have remote communication capabilities.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCW, CW2, dCW2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "token provider computer" can include a system that services tokens. In some embodiments, a token provider computer can facilitate requesting, determining (e.g., generating) and/or issuing tokens, as well as maintaining an established mapping of tokens to primary account numbers (PANs) in a repository (e.g. token vault). In some embodiments, the token provider computer may establish a token assurance level for a given token to indicate the confidence level of the token to PAN binding. The token provider computer may include or be in communication with a token vault where the generated tokens are stored. The token provider computer may support token processing of payment transactions submitted using tokens by de-tokenizing the token to obtain the actual PAN. In some embodiments, a token provider computer may include a tokenization computer alone, or in combination with other computers such as a processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or locations. Examples of resource providers includes merchants, data providers, transit agencies, governmental entities, venue and dwelling operators, etc. A "resource provider computer" may be any suitable computing device that may be operated by, or on behalf of, a resource provider.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may refer to a business entity (e.g., a bank) that maintains an account for a user. An issuer may also issue payment credentials stored on a portable device. An "authorizing entity computer" may be operated by, or on behalf of, an authorizing entity.

An "issuer" may typically refer to a business entity (e.g., a bank) that maintains an account for a user. An issuer may also issue payment credentials stored on a portable device, such as a cellular telephone, smart card, tablet, or laptop to the consumer.

A "service provider computer" may include any suitable computing device configured to provide a service. By way of example, a service provider computer may one or more server computers configured to interact with a variety of devices and/or systems to support ultrasound transaction processing. In some embodiments, a service provider computer may be a server computer configured to perform Point-of-Sale (POS) terminal functionality (EMV® technology) for transactions (e.g., payment transactions). A service provider computer may also be referred to as a software defined point of sale (POS) and/or a "cloud POS".

A "thin client" may refer to a type of access device. The thin client may be configured to perform limited functionality to facilitate transactions between a portable device and a remote computer. A thin client may interface with a variety of devices/components such as a user interface (e.g., a display, a card reader, etc.), a portable device, and/or a verification entry device (e.g., a pin pad, a biometric reader, etc.). In some embodiments, the thin client maintains the processing flow context and coordinates the processing flow between the remote computer (e.g., the cloud POS) and the local interfaces such as user interface(s), the portable device, and/or the verification entry device(s). In some embodiments, the thin client may be capable of communicating using different communication protocols. When receiving, from a portable device, communications under a communication protocol that is incompatible with a remote computer, the thin client may convert the received communications to be compatible with the remote computer and forward the converted communications. Likewise, when receiving communications from the remote computer, the thin client may convert the communications to a communication protocol that is incompatible with the remote computer (e.g., a communications protocol associated with the portable device) before forwarding the converted communication to the portable device. Generally, a thin client may perform any suitable operations for facilitating data communications between a portable device and a remote computer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Current interactions between, for example, a mobile device and an access device can use a communication protocol such as NFC. In an NFC transaction between a mobile device and an access device, each of the mobile device and the access device maintains a state during an interaction session. These two devices need to be in continuous communication with each other to complete a transaction.

Embodiments discussed herein are directed to providing a stateless and session-less transaction protocol that can use sound, and in particular ultrasonic sound (e.g., sound having a frequency of between 20 kHz and 100 MHz). The techniques described herein are directed to performing a transaction, at least in part, utilizing sound data exchanged between two devices (e.g., a computing device and an access device). The protocol disclosed herein conforms to the limitations of data on sound technology (e.g., half duplex, difficulty in maintaining session, low bandwidth, long latency to switch between sending and receiving, etc.) while enabling a transaction such as a payment transaction to be performed in a secure manner. The techniques described herein enable a stateless and session-less secure payment protocol for sound. That is, a mobile device and an access device need not be in continuous communication with each other to complete a transaction in embodiments of the invention. However, as will be illustrated in further detail below, embodiments of the invention are secure.

FIG. 1 shows a block diagram of a system 100 and method for performing a transaction utilizing a stateless and session-less protocol, in accordance with at least one embodiment. FIG. 1 illustrates an example in which a transaction may be performed between a computing device 102 and an access device 104 utilizing sound as a communications channel. For simplicity of illustration, a certain number of components are shown in FIG. 1. It is understood, however, that embodiments of the invention may include more than one of each component.

System 100 may comprise a number of components according to an embodiment of the invention. The system 100 comprises a computing device 102, an access device 104, a service provider computer 106, a token provider computer 108, a processing network computer 110, a transport computer 112, and an authorizing entity computer 114. The computing device 102 and the access device 104 may be in local or short range communication with each other (e.g., via sound and/or less than about 10 meters or 5 meters apart). The computing device 102 and access device 104 may be in communication with the service provider computer 106 via a communications channel such as the Internet. Similarly the token provider computer 108, the service provider computer 106, the processing network computer 110, the transport computer 112, the authorizing entity computer 114, or any suitable combination of the above, may be in communication via a communications channel such as the Internet.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The computing device 102 may be operated by a user. The computing device 102 may include an application, and any suitable number of interfaces that enable the user to provide payment account data (e.g., a credit/debit card number, expiration date, a CV number, a primary account number, etc.). The payment account data may be stored at the computing device 102 and may be available for subsequent transaction processing. The computing device 102 may further include a microphone and a speaker for exchanging data with any other suitable device (e.g., the access device 104).

The access device 104 may be operated by a resource provider (e.g., a merchant). The access device 104 may be an example of a computing device. In some embodiments, the access device 104 may include an application, and any suitable number of interfaces that enable data exchanges to occur with the computing device 102 via sound. The access device 104 may further include a microphone and a speaker for exchanging data with any suitable computing device (e.g., the computing device 102). In some embodiments, the access device 104 is located within a resource provider location (e.g., a merchant brick and mortar store).

The access device 104 may be configured to exchange any suitable data with the computing device 102 via sound. In some embodiments, the access device 104 may transmit data (e.g., received from the computing device 102) to the service provider computer 106 and receive data from the service provider computer 106. In some embodiments, the computing device 102 may similarly transmit and receive data to/from the service provider computer 106.

The service provider computer 106 may provide a payment acceptance service in a cloud computing environment. For example, the service provider computer 106 may be a server computer configured to perform Point-of-Sale (POS) terminal functionality for transactions (e.g., payment transactions). The service provider computer 106 may also be referred to as a software defined point of sale (POS) and/or a "cloud POS". In some embodiments, the service provider computer 106 may be communicatively coupled with the token provider computer 108 and the transport computer. The service provider computer 106 may be configured to communicate data to the processing network computer 110 and/or the authorizing entity computer via the transport computer 112 as seen in FIG. 1.

The token provider computer 108 can include a system that services tokens (e.g., payment tokens). In some embodiments, a token provider computer 108 can facilitate requesting, determining (e.g., generating) and/or issuing tokens, as well as maintaining an established mapping of tokens to primary account numbers (PANs) in a repository (e.g. token vault, not depicted). In some embodiments, the token provider computer 108 may establish a token assurance level for a given token to indicate the confidence level of the token to PAN binding. The token provider computer 108 may include or be in communication with a token vault where the generated tokens are stored. The token provider computer 108 may support token processing of payment transactions submitted using tokens by de-tokenizing the token to obtain a real credential such as a PAN. In some embodiments, a token provider computer 108 may include a tokenization computer alone, or in combination with other computers such as a processing network computer.

The processing network computer 110 may include a server computer used for processing network data. In some embodiments, the processing network computer 110 may be coupled to a database and may include any hardware, software, other logic, or combination of the preceding for servicing the requests from one or more client computers. The processing network computer 110 may comprise one or more computational apparatuses and may use any of a variety of computing structures, arrangements, and compilations for servicing the requests from one or more client computers. In some embodiments, the processing network computer 110 may operate multiple server computers. In such embodiments, each server computer may be configured to process transaction for a given region or handles transactions of a specific type based on transaction data.

The processing network computer 110 may include data processing subsystems, networks, and operations used to support and deliver authorization services, exception file services, and clearing and settlement services. An exemplary processing network computer 110 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer 110 may use any suitable wired or wireless network, including the Internet. The processing network computer 110 may be communicatively connected to the token provider computer 108, the transport computer 112, and/or the authorizing entity computer 114 through any suitable network.

The authorizing entity computer 114 may be operated on behalf of a financial institution that manages a financial account on behalf of the user. The authorizing entity computer 114 may be communicatively connected to the processing network computer 110. In some embodiments, the authorizing entity computer 114 may be communicatively connected to the transport computer 112 and/or the token provider computer 108 through the processing network computer 110.

The steps discussed below in connection with FIG. 1, may be directed to performing a transaction between the components of FIG. 1 utilizing, at least in part, data exchanged via sound.

Before step 1, the computing device 102 may be utilized to store payment data of the user. By way of example, the user may utilize any suitable interface provided by the computing device 102 to provide payment data (e.g., credit/debit card number, expiration date, CVV, a primary account number, etc.) to it. For example, payment data may be received by the computing device 102 over the air, via a cellular communications network. The computing device 102 may then store such data for subsequent transactions. In some embodiments, the computing device 102 may be configured to store multiple instances of payment data and may enable the user to select particular payment data with which to perform a transaction.

In some embodiments, the computing device 102 may be configured to perform a registration process with the service provider computer 106. During this registration process, the computing device 102 may provide device data associated with the computing device 102 (e.g., device identifier (ID), a serial number, etc.) and/or user verification data (e.g., name, address, phone number, username, password, PIN, payment data, etc.). User verification data may include any suitable data that may be utilized to verify the identity of the user.

Additionally, before step 1, the access device 104 may perform a registration process with service provider computer 106. During this registration process, the access device 104 may provide any suitable data (e.g., merchant ID, access device ID, access device data such as location, etc.) to the service provider computer 106. The service provider computer 106 may be configured to generate and assign a unique beacon identifier (ID) (otherwise generically referred to herein as a "unique identifier") to the access device 104. The service provider computer 106 may maintain a mapping or other association between the access device 104 and the assigned beacon ID. The access device 104 may have different identifier such as a terminal ID, and the beacon ID may be associated with the terminal ID. In some embodiments, the access device 104 may be configured to request a new beacon ID at a predetermined interval (e.g., every 10 minutes, 5 minutes, etc.) for the access device (or terminal ID associated with the access device) and/or according to a predefined schedule. As such, the beacon ID may have a time to live (TTL) and may be invalid after a certain period of time (e.g., invalid after 12:00 pm on Jan. 5, 2020). The beacon ID may be refreshed periodically to help prevent replay and relay attacks.

At step 1, the computing device 102 may receive initial data comprising at least the beacon ID (a unique identifier) from the access device 104. In some embodiments, the access device 104 may transmit the initial data including the beacon ID via sound (e.g., high-frequency sound, non-audible to the human ear sound) utilizing a speaker of the access device 104. The computing device 102 may include a microphone configured to receive the sound provided by the speaker. In some embodiments, the data received by the computing device 102 may include additional transaction data such as merchant ID, location, payment amount, item identifiers, and/or the like.

At step 2, the user may utilize any suitable interface provided by the computing device 102 (e.g., via an application operating on the computing device 102) to confirm a transaction amount. In some embodiments, a transaction amount or other data may be received with the beacon ID at step 1. By way of example, the transaction amount may be received via sound from the access device 104 and presented to the user at an interface provided by the computing device 102. As another example, the computing device 102 may calculate a transaction amount. For example, the computing device 102 may utilize any suitable input/output device (e.g., a keyboard, a touch screen, a scanner, not depicted) to obtain transaction information (e.g., item information corresponding to one or more items to be purchased).

In some embodiments, the computing device 102 may provide any suitable number of interfaces with which a transaction may be initiated. For example, a user of the computing device 102 may utilize any suitable input/output device (e.g., a keyboard, a touch screen, a scanner, not depicted) to obtain transaction information (e.g., item information corresponding to one or more items to be purchased). By way of example, the computing device 102 may provide one or more interfaces that enable a user to enter in item information (e.g., an item identifier, a quantity, a price) via a provided interface. In some embodiments, the computing device 102 may include an interface in which a bar code, a QR code, or any suitable device ID may be scanned and/or captured (e.g., via a reader device or a camera device not depicted). In some embodiments, item information may be retrieved utilizing the scanned and/or captured data. For example, item information including an item identifier and/or a price may be embedded in a QR code and decoded by the computing device 102. As another example, a bar code may be utilized to decode an item identifier with which an item price may be retrieved (e.g., from a locally stored item catalog and/or from a remote computer configured to provide such information). The computing device 102 may be configured to calculate a total amount corresponding to an aggregation of the price(s) corresponding to one or more items for which item identifiers were entered, scanned, or captured.

The user may be provided a confirmation mechanism such as a "confirm" button that, upon selection, indicates the user's confirmation of the transaction amount and/or other transaction data. Upon confirming the transaction amount (or other transaction data), the computing device 102 may transmit data (herein referred to as "first data") to the service provider computer 106 (e.g., via a network such as the Internet). By way of example, the computing device 102 may transmit, to the service provider computer 106, first data including any suitable combination of the beacon ID received from the access device 104, the transaction amount, a location associated with the computing device 102, user verification information (e.g., payment data, username, password PIN, etc.), device information associated with the computing device 102 (e.g., device ID), and the like.

At step 3, the service provider computer 106 may verify the data received from the computing device 102. By way of example, the service provider computer 106 may verify that the computing device 102 location is within a predetermined threshold distance of a location associated with the access device 104 that provided the beacon ID. In some embodiments, the service provider computer 106 may decline to provide further processing should the computing device location fall outside the predetermined distance of the location associated with the beacon ID of the access device 104. The service provider computer 106 can provide an indication at the computing device 102 that the data was determined to be invalid and this indication may be presented to the user at the computing device 102.

The service provider computer 106 may also compare the beacon ID received from the computing device 102 to the beacon ID that it previously provided to the access device 104 to see if they match. As noted above, the beacon ID may be periodically transmitted to the access device 104 and may have a time to live (TTL). The server provider computer 106 may also determine if the receipt of the beacon ID from the computing device 102 does or does not exceed the TTL. If it does, then the process may stop. If it does not, and if the beacon IDs match, then the transaction may proceed.

As another example, the service provider computer 106 may compare the device data and/or the user verification data received from the computing device 102 to previously-stored data (e.g., device data and/or user verification data provided by the user during a registration process performed with the service provider computer 106).

When the data received from the computing device 102 is verified (e.g., matches previously stored data as described above), the service provider computer 106 may transmit a token request message to the token provider computer 108. In some embodiments, the token request message may include any suitable data including a credential such as the payment data (e.g., a primary account number) received and/or associated with the user of the computing device 102. In some embodiments, the token request message may include any suitable combination of track 2 data (or any suitable data) associated with a payment card, a transaction counter, a token requestor identifier, a portion or all of a payment account number (PAN), a beacon ID, an expiration date, and the like.

At step 4, the token provider computer 108 may generate a token (e.g., a payment token) and/or token cryptogram for the data received (e.g., the payment data). In some embodiments, the token provider computer 108 may maintain a mapping or other association between the token, cryptogram, and the received data (e.g., the payment data). The token provider computer 108 may send a token response message comprising the token and/or the cryptogram to the service provider computer 106. Upon receipt, the service provider computer 106 may associate the token with the beacon ID or any suitable previously received data.

At step 5, the service provider computer 106 may be configured to generate a unique session key. The session key may be randomly generated and may be a key that is only used for the current transaction. In some embodiments, the key may be generated utilizing a symmetric encryption algorithm (e.g., an Advanced Encryption Standard (AES), DES, or triple DES algorithm). The generated key may be associated with a session key identifier (ID) and/or the beacon ID previously received from the computing device 102, and the service provider computer 106 may be configured to maintain this association. In some embodiments, the service provider computer 106 may encrypt the token and/or token cryptogram using the generated session key. The encrypted data may then be transmitted to the computing device 102. In some embodiments, the encrypted data may be transmitted with any other suitable data such as the last four digits of the PAN, the session key ID, the beacon ID received from the computing device 102, etc. Collectively, the generated data that is to be provided to the access device 104, which may include one or more of the encrypted data, portion of the PAN, session key ID, beacon ID, etc., may be referred to as "second data."

At step 6, the computing device 102 may be configured to transmit the encrypted data (e.g., the token/cryptogram as encrypted with the session key) to the access device 104 via sound. In some embodiments, the computing device 102 may transmit the encrypted data and any suitable data such as the last four digits of the PAN, the session key ID, the beacon ID, etc. (collectively, referred to as "second data"). By way of example, a speaker of the computing device 102 may be utilized to communicate, via sound, the encrypted data and/or second data discussed above. The access device 104 may include a microphone that receives the sound data communicated by the speaker of the computing device 102. The access device 104 may be configured to decode the sound data received from the computing device 102.

At step 7, the access device 104 may be configured to determine whether the beacon ID received (e.g., via sound) from the computing device 102 matches the beacon ID assigned to the access device 104 by the service provider computer 106. In some embodiments, the access device 104 may compare the received beacon ID to the stored beacon ID (e.g., received periodically or in the registration process previously performed with the service provider computer 106). If the received beacon ID does not match the stored beacon ID, the access device 104 may be configured to cease processing of the received data. If, however, the beacon ID received (e.g., via sound) from the computing device 102 matches the previously-stored beacon ID, the access device 104 may be configured to transmit the data received from the computing device 102 (e.g., the encrypted token/cryptogram as encrypted with the session key, the last four digits of the PAN, the session key ID, the beacon ID, etc.) to the service provider computer 106. The data transmitted by the access device 104 to the service provider computer 106 may be referred to as "third data" and may include one or more of the above-described pieces of data.

At step 8, the service provider computer 106 may verify that the beacon ID (or any suitable portion of the third data) is valid (e.g., the beacon ID has not exceeded an expiration date and/or time associated with the beacon ID). If the beacon ID (or any portion of the third data) is determined to be invalid, the service provider computer 106 may be configured to cease processing the data received from the access device 104. If the beacon ID is determined to be valid, the service provider computer 106 may continue on with processing the received data.

In some embodiments, the service provider computer 106 may determine (e.g., utilizing a mapping maintained by the service provider computer 106) whether the session key ID that was received from the access device 104, is associated with the beacon ID received from the access device 104. If not, the service provider computer 106 may be configured to cease processing the received data and the transaction may fail. If the session key ID does match the beacon ID, the session key associated with the session key ID (and/or the beacon ID) may be retrieved. Once retrieved, the session key may be utilized to verify the encrypted data. By way of example, the session key may be utilized to decrypt the encrypted portion of the data received from the access device 104 to obtain the token and/or cryptogram. The decrypted token/cryptogram may be compared to the token/cryptogram associated with the beacon ID. The token/cryptogram may be verified when it matches the beacon ID or the token/cryptogram may be determined to be invalid when the token/cryptogram is not associated with the beacon ID. If invalid, the service provider computer 106 may cease processing the received data.

In some embodiments, the service provider computer 106 may generate an authorization request message when the beacon ID is determined to be valid, the received session key ID is determined to be associated with the received beacon ID, and/or the decrypted token/cryptogram is determined to be associated with the received beacon ID. The authorization request message may be generated utilizing the data received and transmitted to the transport computer 112. In some embodiments, the authorization request message may include the token and/or token cryptogram. The token and/or token cryptogram may be utilized in lieu of payment data associated with the user of the computing device 102.

At step 9, the transport computer 112 may route the authorization request message to the processing network computer 110.

At step 10, the processing network computer 110 may request payment data from the token provider computer 108. By way of example, the processing network computer 110 may provide the token and/or token cryptogram to the token provider computer 108.

At step 11, the token provider computer 108 may retrieve the payment data associated with the token and/or cryptogram and provide the retrieved payment data to the processing network computer.

At step 12, the processing network computer 110 may modify the authorization request message by replacing the token and/or cryptogram in the authorization request message with the payment data received from the token provider computer 108. The modified authorization request message may then be forwarded to the authorizing entity computer 114.

At step 13, the authorizing entity computer 114 (e.g., operated on behalf of an issuer) may perform any suitable data processing to determine whether or not to authorize the transaction requested in the authorization request message. The authorizing entity computer 114 may generate an authorization response message which indicates, among other things, whether the transaction was approved or denied. The authorization response message may be transmitted from the authorizing entity computer 114 to the processing network computer 110.

At step 14, the processing network computer 110 may forward the authorization response message to the transport computer 112.

At step 15, the transport computer 112 may forward the authorization response message to the service provider computer 106.

At step 16, the service provider computer 106 may transmit the authorization response message to the access device 104 to indicate that the transaction was approved or denied.

At step 17, the service provider computer 106 may transmit any suitable data to the computing device 102 to cause a notification to be presented at the computing device 102 that indicates whether the transaction was approved or denied. This notification may be in any suitable form such as visual (e.g., presented at a graphical interface, a push notification, text, graphics, etc.), audible (e.g., presented via an audible alert, a chime, or any suitable sound provided at a speaker of the computing device 102), and/or haptic.

At a later date or time, a clearing and settlement process may take place between a transport computer 112 operated by an acquirer associated with the access device 104, the processing network computer 110, and the authorizing entity computer 114.

FIG. 2 illustrates a block diagram of a transaction system 200, in accordance with at least one embodiment. The transaction system 200 may be an example of a portion of the system 100 of FIG. 1. The block diagram illustrates partial computer architectures of the service provider computer 106, the computing device 102, and the access device 104.

The service provider computer 106 is illustrated as comprising a plurality of hardware and software modules (210-222). However, it should be appreciated that this is provided for illustration purposes only, and each of the modules and associated functionality may be provided and/or performed by the same or different components. That is, the service provider computer 106 may perform some of the relevant functions and steps described herein through the use of any suitable combination of software instructions and/or hardware configurations. It should be noted that although FIG. 2 illustrates all of the modules located on a single device, the disclosure is not meant to be so limited. Moreover, a system for implementing the functionality described herein may have additional components or less then all of these components. Additionally, some modules may be located on other devices that are functionally connected to the component(s) of the service provider computer 106. In some cases, the software modules may be located on a virtual machine or a container.

The service provider computer 106 may be a server computer (e.g., a server computer operating in a cloud computing environment). The service provider computer 106 is shown as comprising a processor 204, system memory 206 (which may comprise any combination of volatile and/or non-volatile memory such as, for example, buffer memory, RAM, DRAM, ROM, flash, or any other suitable memory device), and an external communication interface 208. Moreover, one or more of the modules 210, 212, 214, 218, 220, 222 may be disposed within one or more of the components of the system memory 206, or may be disposed externally. As was noted above, the software and hardware modules shown in FIG. 2 are provided for illustration purposes only, and the configurations are not intended to be limiting. The processor 204, system memory 206 and/or external communication interface 208 may be used in conjunction with any of the modules 210-212 described below to provide a desired functionality. Some exemplary modules and related functionality are discussed below.

The service provider computer 106 may include computing device API 218. Computing device API 218 may be programmed to cause the service provider computer 106 to send and/or receive any suitable data from a computing device (e.g., the computing device 102). By way of example, the computing device API may be programmed to cause the service provider computer 106 to receive any suitable data as part of a registration process performed with the computing device 102. In some embodiments, the computing device API 218 may be used to receive device information associated with the computing device 102, user verification data (e.g., name, address, phone number, username, password, PIN, etc.) payment data (e.g., credit/debit card number, PAN, expiration date, CW, etc.). In some embodiments, the computing device API 218 may be utilized to receive transaction data from a computing device 102. By way of example, the transaction data may include the beacon ID received by the computing device 102 from the access device 104, a transaction amount, a location associated with the computing device 102, user verification information (e.g., payment data, username, password PIN, etc.), device information associated with the computing device 102 (e.g., device ID), and the like. In some embodiments, the computing device API 218 may pass received information to any suitable component of the service provider computer 106 (e.g., the processing module 214).

The service provider computer 106 may include access device API 222. Access device API 222 may be programmed to cause the service provider computer 106 to send and/or receive any suitable data from an access device (e.g., the access device 104). By way of example, the access device API 222 may be programmed to cause the service provider computer 106 to receive any suitable data as part of a registration process performed with the access device 104. In some embodiments, the access device API 222 may be used to receive data associated with the access device 104 (e.g., merchant name, merchant ID, access device ID, location associated with the access device 104, etc.). In some embodiments, the access device API 222 may pass information received from the access device 104 to any suitable component of the service provider computer 106 (e.g., the beacon ID manager 212). In some embodiments, the access device API 222 may be utilized to receive transaction data from access device 104. By way of example, the transaction data may include encrypted data (e.g., an encrypted token and/or encrypted token cryptogram), a beacon ID, a session key ID, a PAN (or portion of a PAN), a transaction amount, a resource provider ID (a merchant ID), etc.). The access device API 222 may be configure to provide such received data to any suitable component of the service provider computer 106 (e.g., the processing module 214).

The processing module 214 may be configured or programmed to cause the service provider computer 106 to perform some or all of the functionality associated with performing a registration process with the access device 104. By way of example, the access device 104 may provide any suitable data (e.g., merchant ID, access device ID, access device data such as location, etc.) which may be received by the processing module 214 via the access device API 222. The received data may be provided to the beacon ID manager 212 which may be configured to cause the service provider computer 106 to generate and assign one or more unique beacon identifiers (ID) to the access device 104, during the registration process or after the registration process. The beacon ID manager 212 may be programmed or configured to cause the service provider computer 106 to maintain a mapping or other association between the access device 104 and the one or more assigned beacon IDs and any suitable combination of the received data (e.g., merchant ID, access device ID, access device data such as location, etc.). The beacon ID may be further associated with an expiration day/time. Upon reaching the expiration date/time, the beacon ID manager 212 may be programmed to cause the service provider computer 106 to delete the association between the expired beacon ID and the access device 104 to which it had been assigned. The beacon ID manager 212 may be programmed to cause the service provider computer 106 to provide a newly generated beacon ID to the processing module 214, which may be programmed to cause the service provider computer 106 to transmit the beacon ID to the access device 104 via the access device API 222.

The processing module 214 may be configured or programmed to perform some or all of the functionality associated with performing a registration process with the computing device 102. By way of example, the computing device 102 may provide payment data (e.g., credit/debit card number, expiration date, CW, a primary account number, etc.), user verification data (e.g., name, address, phone number, username, password, PIN, etc.) associated with the user, user device data (e.g., device ID, a serial number, etc.), or any suitable combination of the above. Such data may be received via the computing device API 218 and provided to the processing module 214. The processing module 214 may store the received data.

The processing module 214 may be configured or programmed to receive data associate with a transaction from the computing device 102 via the computing device API 218. In some embodiments, the data may include a beacon ID, a merchant ID, device data associated with the computing device 102, a location of the computing device 102, user verification data, a transaction amount, or the like. The processing module 214 may verify the data received from the computing device 102. By way of example, the processing module 214 may verify that the computing device 102 location is within a predetermined threshold distance of a location associated with the beacon ID provided. The processing module 214 may retrieve any suitable data (e.g., a location) associated with the beacon ID from the mapping maintained by the beacon ID manager 212 and accessible to the processing module 214. In some embodiments, the processing module 214 may decline to provide further processing should the computing device location fall outside the predetermined distance of the location associated with the beacon ID provided (e.g., the beacon ID associated with the access device 104). The processing module 214 can provide an indication to the computing device 102 via the computing device API 218 that the data was determined to be invalid and this indication may be presented to the user at the computing device 102.

As another example, the processing module 214 may compare the device data and/or the user verification data received from the computing device 102 to previously-stored data (e.g., device data and/or user verification data provided by the user during a registration process performed with the computing device 102). When the data received from the computing device 102 is verified (e.g., matches previously stored data as described above), the processing module 214 may be programmed to cause the service provider computer 106 to transmit a token request message to the token provider computer 108 via the token interface 210. In some embodiments, the token request message may include any suitable data such as the payment data received and/or associated with the user of the computing device 102. In some embodiments, the token request message may include any suitable combination of track 2 data (or any suitable data) associated with a payment card, a transaction counter, a token requestor identifier, a portion or all of a payment account number (PAN), a beacon ID, an expiration date, and the like.

The service provider computer 106 may include a token interface 210. The token interface 210 may be programmed to cause the service provider computer 106 to receive and/or transmit any suitable data between the service provider computer 106 and a token provider (e.g., the token provider computer 108). By way of example, the token interface 210 may be programmed to cause the service provider computer 106 to generate a token request message. In some embodiments, the token request message may include any suitable data such as the payment data received (e.g., via the computing device API 218) and/or associated with the user (e.g., a user of the computing device 102). In some embodiments, the token request message may include any suitable combination of track 2 data (or any suitable data) associated with a payment card, a transaction counter, a token requestor identifier, a portion or all of a payment account number (PAN), a beacon ID, an expiration date, and the like. The token interface 210 may be programmed to cause the service provider computer 106 to receive token response messages that include a token and/or cryptogram generated by the token provider computer 108. In some embodiments, the token interface 210 may be programmed to cause the service provider computer 106 to provide the token response message received to the session key manager 220.

In some embodiments, the session key manager 220 may be programmed to cause the service provider computer 106 to receive a token and/or token cryptogram from the token interface 210. The session key manager 220 may generate a unique session key upon receipt of the token or at any suitable time. In some embodiments, the key may be generated utilizing a symmetric encryption algorithm (e.g., an Advanced Encryption Standard (AES) algorithm). The generated key may be associated (e.g., mapped, bound, etc.) with a session key identifier (ID) and/or the beacon ID previously received from the computing device 102 and maintained in the mapping. In some embodiments, the session key manager 220 may encrypt the token and/or token cryptogram using the generated session key or the session key manager 220 may provide the session key to the processing module 214 such that the processing module 214 may encrypt the token and/or token cryptogram using the generated session key. The encrypted data may then be transmitted (e.g., by the session key manager 220 or the processing module 214) to the computing device 102. In some embodiments, the encrypted data may be transmitted with any suitable data such as the last four digits of the PAN, the session key ID, the beacon ID received from the computing device 102, etc.

In some embodiments, the processing module 214 may be programmed to cause the service provider computer 106 to verify that a beacon ID received from the access device 104 via the access device API 222 is valid (e.g., has not exceeded an expiration date and/or time associated with the beacon ID). In some embodiments, the processing module 214 may provide the received beacon ID to the beacon ID manager 212. The beacon ID manager 212 may be programmed to cause the service provider computer 106 to determine whether the beacon ID received is associated with the session key ID received from the access device 104 via the access device API 222. The beacon ID manager 212 may be programmed to cause the service provider computer 106 to determine if the beacon ID is known (e.g., is stored in a mapping) and, if so, if the beacon ID has an expiration date/time that is still in the future. If the beacon ID is determined to be invalid (e.g., not known, expired), the beacon ID manager 212 may transmit an indication to the processing module 214 to cause the processing module 214 to cease processing the data received from the access device 104. If the beacon ID is determined to be valid, the beacon ID manager 212 may provide an indication to the processing module 214 that the beacon ID is valid to cause the processing module 214 to continue with processing data received from the access device 104. In some embodiments, the service provider computer 106 may determine (e.g., utilizing a mapping maintained by the service provider computer 106) whether the session key ID received is associated with the beacon ID received. If not, the service provider computer 106 may be programmed to cause the service provider computer 106 to cease processing the received data and the transaction may fail. If the session key ID does match the beacon ID, the session key associated with the session key ID (and/or the beacon ID) may be retrieved. Once retrieved, the session key may be utilized to decrypt the encrypted portion of the data received from the access device 104 to obtain the token and/or cryptogram. In some embodiments, the service provider computer 106 may generate an authorization request message utilizing the data received and transmit the authorization request message to the transport computer 112. In some embodiments, the authorization request message may include the token and/or token cryptogram. The token and/or token cryptogram may be utilized in lieu of payment data associated with the user of the computing device 102.

The processing module 214 may be configured or programmed to perform some or all of the functionality associated with receiving, sending, and generating electronic messages at the service provider computer 106 to or from any of the entities shown in FIG. 1 (e.g., the transport computer 112). When an electronic message is received by the service provider computer 106 via the external communication interface 208, it may be passed to the processing module 214. The processing module 214 may identify and parse the relevant data based on a particular messaging protocol used in the service provider computer 106. The processing module 214 may then transmit any received information to an appropriate module within the service provider computer 106. The processing module 214 may also receive information from one or more of the modules in the service provider computer 106 and generate an electronic message in an appropriate data format (e.g., an authorization request message) in conformance with a transmission protocol used in the service provider computer 106 so that the message may be sent to one or more entities within system (e.g., the transport computer 112). The electronic message may then be passed to the external communication interface 208 for transmission. In some embodiments, the processing module 214 may be programmed to cause the service provider computer 106 to perform point of sale transaction processing in a cloud computing environment.

The processing module 214 may be programmed to cause the service provider computer 106 to receive electronic messages such as authorization response messages. Upon receipt, or at any suitable time, the processing module 214 may be programmed to cause the service provider computer 106 to transmit the authorization response message and/or a data indicating whether the transaction was approved or denied (and, in some cases a reason code for a denial) to the computing device 102 and/or the access device 104 via the computing device API 218 and access device API 222, respectively.

It should be appreciated that the mapping and/or associations between any suitable combination of the beacon ID, device data, computing device location, user verification data, payment data, session key, session ID, merchant ID, access device ID, access device location may be stored in multiple mappings or a single mapping accessible to any suitable combination of the components of the service provider computer 106.

The computing device 102 may include a plurality of hardware and software modules. However, it should be appreciated that this is provided for illustration purposes only, and each of the modules and associated functionality may be provided and/or performed by the same or different components.

Although not depicted, the computing device 102 may comprise a processor, system memory, and an external communication interface. The computing device 102 may also comprise a transducer that can be used to convert electrical signals into sound, and vice-versa. Moreover, one or more of the modules/components 230-236 may be disposed within one or more of the components of the system memory, or may be disposed externally. The processor, system memory, and/or external communication interface may be used in conjunction with any of the modules described below to provide a desired functionality. Some exemplary modules and related functionality may be as follows.

The application 230 may be configured or programmed to cause the computing device 102 to provide any suitable number of interfaces (e.g., programming interfaces). By way of example, the application 230 may provide interfaces for performing a registrations process with the service provider computer 106. In some embodiments, the interfaces may enable the user to provide user verification data (e.g., name, address, phone number, birthdate, username, password, PIN, etc.), payment data (e.g., credit/debit card number, expiration date, CW, PAN, etc.). The application 230 may enable a user to store multiple instances of payment data from which the user may select when performing a transaction.

The computing device 102 may include a speaker 234 and a microphone 236. In some embodiments, the computing device 102 may include other input/output components not depicted (e.g., a keyboard, a touch screen, a display, etc.). The computing device 102 may further include ultrasound SDK 232 which may be configured or programmed to cause the computing device 102 to encode data received from the application 230 into high frequency sound signals and transmit these signals via the speaker 234. In some embodiments, the high frequency sound may include high frequency acoustic signals, which may include inaudible sound. Such sound or acoustic signals may have frequencies less than about 20 Hz. The ultrasound SDK 232 may further be configured or programmed to cause the computing device 102 to receive high frequency sound signals via microphone 236 and decode these signals before providing the decoded data to the application 230.

In some embodiments, the application 230 may receive a beacon ID from the access device 104. In some embodiments, the access device 104 may transmit data including the beacon ID via sound (e.g., high-frequency, non-audible to the human ear sound) utilizing speaker 246. The microphone 236 may be configured to receive the sound provided by the speaker 246. The received data may be decoded using ultrasound SDK 232 and provided to the application 230. In some embodiments, the data received may include additional transaction data such as merchant ID, location, payment amount, item identifiers, and/or the like.

The application 230 may be configured or programmed to cause the computing device 102 to provide any suitable number of interfaces with which a transaction may be initiated. By way of example, the application 230 may enable a user to enter in item information (e.g., an item identifier, a quantity, a price) via a provided interface. In some embodiments, the application 230 may include an interface in which a bar code, a QR code, or any suitable device ID may be scanned and/or captured (e.g., via a reader device or a camera device not depicted). In some embodiments, item information may be retrieved utilizing the scanned and/or captured data. For example, item information including an item identifier and/or a price may be embedded in a QR code and decoded by the application 230. As another example, a bar code may be utilized to decode an item identifier with which an item price may be retrieved (e.g., from a locally stored item catalog and/or from a remote computer configured to provide such information). The application 230 may be configured to calculate a total amount corresponding to an aggregation of the price(s) corresponding to one or more items for which item identifiers were entered, scanned, or captured via the application 230.

In some embodiments, the user may utilize any suitable interface provided by the application 230 to confirm a transaction amount. By way of example, a transaction amount received via sound from the access device 104 may be decoded (e.g., by the ultrasound SDK 232) and presented to the user at an interface provided by the application 230. Alternatively, a transaction amount (e.g., a total amount) may be presented via the application 230 that corresponds to one or more item identifiers entered, scanned, or captured via the application 230. The application 230 may provide a confirmation mechanism such as a "confirm" button that, upon selection, indicates the user's confirmation of the transaction amount. Upon confirming the transaction amount (or other transaction data), the application 230 may be configured to transmit, to the service provider computer 106, the beacon ID received from the access device 104, the transaction amount, a location associated with the computing device 102, user verification information (e.g., payment data, username, password PIN, etc.), device information associated with the computing device 102 (e.g., device ID), and the like.

In some embodiments, the application 230 may receive data from the service provider computer 106. By way of example, the application 230 may receive an encrypted token/cryptogram (encrypted using a session key generated by the session key manager 220) and additional data (e.g., a PAN, a portion of a PAN, a session key ID associated with the session key used to encrypt the encrypted data, a beacon ID, etc.). The application 230 may be configured or programmed to cause the computing device 102 transmit the received data. By way of example, the received data may be encoded by the ultrasound SDK 232 and transmitted via the speaker 234 using sound.

The application 230 may be configured to cause the computing device 102 to receive an indication from the service provider computer 106 indicating that a transaction was approved or declined. In some embodiments, the indication may include a reason code (e.g., in situations in which the transaction was declined). The application 230 may be configured or programmed to cause the computing device 102 to present the indication (and/or reason code) to the user via any suitable interface. It should be appreciated that this interface may be visual, audible, and/or haptic.

The access device 104 may include a plurality of hardware and software modules. However, it should be appreciated that this is provided for illustration purposes only, and each of the modules and associated functionality may be provided and/or performed by the same or different components.

Although not depicted, the access device 104 may comprise a processor, system memory, and an external communication interface. The access device 104 may also comprise a transducer that can be used to convert electrical signals into sound, and vice-versa. Moreover, one or more of the modules/components 240, 242, 244, 246 may be disposed within one or more of the components of the system memory, or may be disposed externally. The processor, system memory, and/or external communication interface may be used in conjunction with any of the modules described below to provide a desired functionality. Some exemplary modules and related functionality may be as follows.

The access device 104 may include a speaker 246 and a microphone 244. In some embodiments, the access device 104 may include other input/output components not depicted (e.g., a keyboard, a touch screen, a display, etc.). The access device 104 may further include ultrasound SDK 242 which may be configured or programmed to cause the access device 104 to encode data received from the application 230 into high frequency sound signals and transmit these signals via the speaker 246. The ultrasound SDK 242 may further be configured or programmed to cause the access device 104 to receive high frequency sound signals via microphone 244 and decode these signals before provided the decoded data to the application 240.

The application 240 may be configured or programmed to cause the access device 104 to provide any suitable number of interfaces. By way of example, the application 240 may provide interfaces for performing a registrations process with the service provider computer 106. The application 240 may be configured or programmed to cause the access device 104 to transmit access device data (e.g., merchant name, merchant ID, a location associated with the access device 104, an access device ID, etc.) to the service provider computer 106 (e.g., via the access device API 222). The application 240 may be configured to cause the service provider computer 106 to receive a beacon ID generated by the beacon ID manager 212 and store this beacon ID in local memory. In some embodiments, the application 240 may be configured to cause the access device 104 to communicate with the beacon ID manager 212 to refresh the beacon ID according to a predetermined interval (e.g., every 10 minutes, every 5 minutes, etc.) or according to a predefined schedule. The application 230 may be configured to transmit the beacon ID (e.g., as encoded by the ultrasound SDK 242) via the speaker 246 at any suitable interval and/or according to any suitable schedule.

In some embodiments, the application 230 may provide any suitable number of interfaces with which a transaction may be initiated. For example, a user of the access device 104 may utilize any suitable input/output device (e.g., a keyboard, a touch screen, a scanner, not depicted) to obtain transaction information (e.g., item information corresponding to one or more items to be purchased). The application 240 may generate a payment amount corresponding to a total amount of the transaction. The application 240 may be then cause transaction data (e.g., the beacon ID of the access device 104, the payment amount, item information, location of the access device 104, merchant name, merchant ID, or any suitable data associated with the transaction) to be transmitted. For example, the transaction data may be encoded by the ultrasound SDK 242 and transmitted by the speaker 246.

In some embodiments, the application 240 may be configured or programmed to cause the access device 104 to determine whether the beacon ID received (e.g., via sound) from the computing device 102 matches the beacon ID assigned to the access device 104 by the service provider computer 106. In some embodiments, the application 240 may be configured or programmed to cause the access device 104 to compare the received beacon ID to a stored beacon ID that was stored at the access device 104 during a registration process previously performed with the service provider computer 106. If the received beacon ID does not match the stored beacon ID, the application 240 may be configured or programmed to cause the access device 104 to cease processing of the received data. If, however, the beacon ID received (e.g., via sound) from the computing device 102 matches the previously-stored beacon ID, the application 240 may be configured or programmed to cause the access device 104 to transmit the data received from the computing device 102 (e.g., an encrypted token/cryptogram as encrypted with a session key, the last four digits of the PAN, the session key ID of the session key used to encrypt the encrypted data, a beacon ID, etc.) to the service provider computer 106.

The application 240 may be configured or programmed to cause the access device 104 to receive an indication from the service provider computer 106 indicating that a transaction was approved or declined. In some embodiments, the indication may include a reason code (e.g., in situations in which the transaction was declined). The application 240 may be configured or programmed to cause the access device 104 present the indication (and/or reason code) to the user via any suitable interface. It should be appreciated that this interface may be visual, audible, and/or haptic.

Figure 3B:
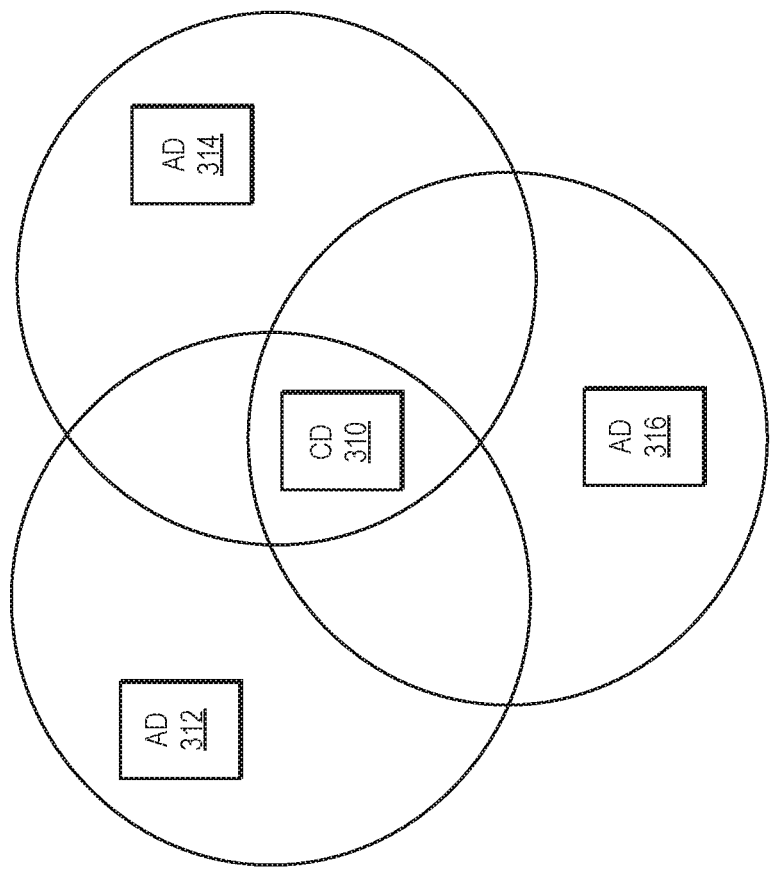
FIGS. 3A and 3B depict block diagrams describing additional aspects of a stateless and session-less protocol discussed in FIGS. 1 and 2.
Figure 3A:
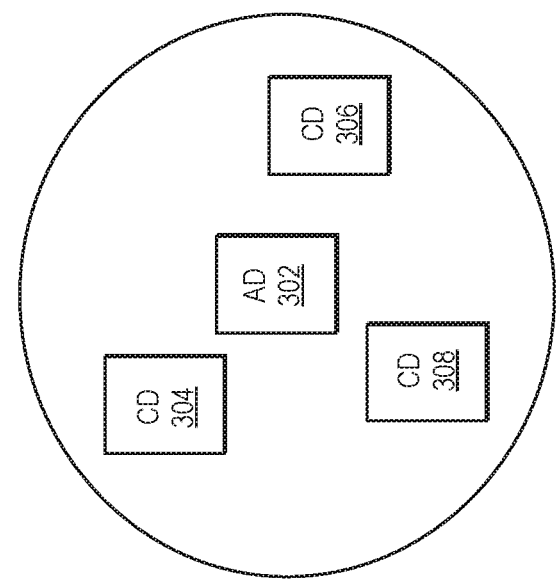

FIGS. 3A and 3B depict block diagrams describing additional aspects of a stateless and session-less protocol. For example, FIG. 3A depicts a use case in a single access device (e.g., access device (AD) 302) transmits a beacon ID which is received by the computing device (CD) 304, 306, and 308. In this use case, any suitable combination of the computing devices (e.g., CD 304, CD 306, and/or CD 308) may utilize the received beacon ID in a subsequent transaction in a similar manner as described above in connection with FIG. 1. Because the protocol described in the above figures is stateless (e.g., a state of the transaction processing is not maintained nor needed) and session-less (e.g., a session is not established between the computing device and access device), any or all of the CD 304, 306, and/or 308 my utilize the beacon ID to perform a transaction with the AD 302.

FIG. 3B depicts a block diagram in which a single computing device (e.g., computing device (CD) 310) receives a beacon ID from multiple access devices (e.g., access device (AD) 312, AD 314, and AD 316). In some embodiments, CD 310 may be configured to select one of the beacon IDs received (e.g., a beacon ID that was received first, before reception of the other two beacon IDs). Upon initiated a transaction, the CD 310 may include the beacon ID in the processing data transmitted (e.g., via a sound signal as described above). In some embodiments, AD 312, 314, and 316 may each receive the processing data. Each access device may be configured to determine, from the received processing data, whether it was the intended recipient. By way of example, CD 310 may utilize the beacon ID provided by the AD 316. AD 312 may check the beacon ID included in the processing data received from CD 310 and determine that the beacon ID included does not match the beacon ID stored in local memory at the AD 312. As a result, AD 312 may forego further processing of the received processing data. Similarly, AD 314 may check the beacon ID included in the processing data received from CD 310 and determine that the beacon ID included does not match the beacon ID stored in local memory at the AD 314. As a result, AD 314 may forego further processing of the received processing data. AD 316 may check the beacon ID included in the processing data received from CD 310 and determine that the beacon ID included matches the beacon ID stored in local memory at the AD 316. As a result, AD 316 may proceed with processing the processing data as described in the above figures.

Figure 4:
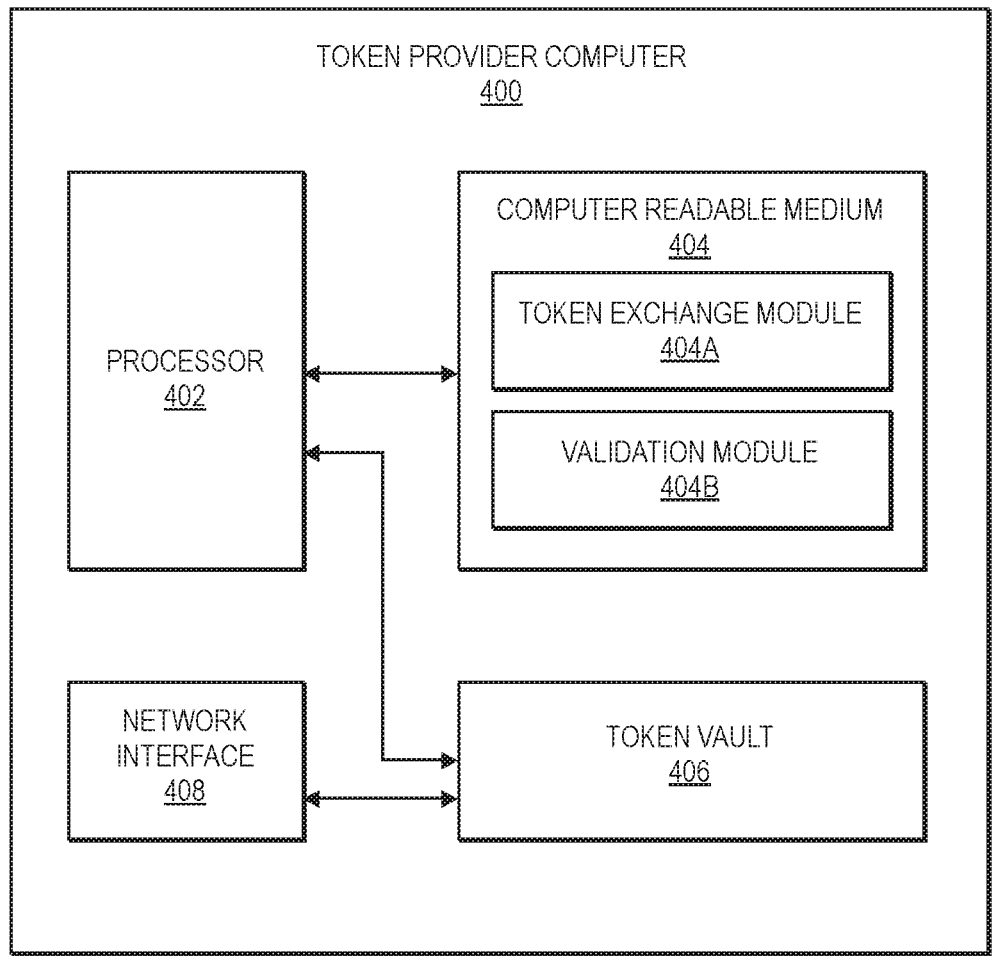
FIG. 4 shows a block diagram of a token provider computer.

FIG. 4 shows a token provider computer 400. The token provider computer 400 includes a processor 402 and a computer readable medium 404, a token vault 406, and a network interface 408 coupled to the processor 402.

The computer readable medium 404 may comprise a token exchange module 404A and a validation module 404B.

The token vault 406 may store tokens and their associated credentials in a database. The token vault 406 may store data in a database such as an Oracle™ database.

The tokenization exchange module 404A may comprise code that causes the processor 402 to provide access tokens. For example, the token exchange module 404A may contain logic that causes the processor 402 to generate a payment token and/or associate the payment token with a set of payment credentials. A token record may then be stored in a token record database indicating that the payment token is associated with a certain user or a certain set of payment credentials.

The validation module 404B may comprise code that causes the processor 402 to validate token requests before a payment token is provided. For example, validation module 404B may contain logic that causes the processor 402 to confirm that a token request message is authentic by decrypting a cryptogram included in the message, by confirming that the payment credentials are authentic and associated with the requesting device, by assessing risk associated with the requesting device.

Although the above-described examples are in the context of a payment transaction that might occur between a computing device such as a mobile phone and an access device such as a POS terminal, embodiments of the invention can be used in other non-financial contexts. For example, the access device may be a device such as a gate device that allows a person to access a secure location and the computing device may be a mobile phone that is associated with the person.

Embodiments of the invention provide for a number of advantages. For example, utilizing the encryption key generation functionality of a service provider computer as described herein, enables secure transmission of sensitive data (e.g., a token, a cryptogram, payment data, etc.). That is, any sensitive information may be encrypted by the service provider computer and provided to a computing device prior to transmission (e.g., via sound) to another device (e.g., an access device). This provides improved security as previously sound data transmission were not encrypted. Utilizing the key management functionality of the service provider computer described herein alleviates computing devices and/or access devices from having to generate and/or maintain keys locally. Additionally, utilizing the encryption functionality discussed above in connection with the service provider computer alleviates the computing device from having to encrypt the data prior to transmission. The functionality discussed above therefore reduces the processing burden of the computing device and/or the access device.

By utilizing a beacon ID that has a limited lifespan (e.g., as defined by an expiration date and/or expiration time) and/or by verifying that a provided beacon ID is associated with a particular session key, relay attacks may be prevented as these techniques prevent the beacon ID from being forwarded and later utilized for fraudulent purposes. Additional checks that verify that computing device is located within a predefined distance of the access device may further enable the system to resist relay attacks. Utilizing the stateless/session-less protocols described above, low bandwidth data over sound technology may be utilized while saving session control bandwidth costs all while completing a transaction in a quicker manner than conventional systems. By utilizing the techniques described herein, no clear payment data may reside on an access device, either in transit or at rest, thus no strong data protection is required at the access device. Because the computing device and/or access device is not required to generate and/or store encryption keys, additional secure data protection measures are unnecessary.

A protocol is defined herein for performing a transaction, at least in part, utilizing sound data exchanged between two devices (e.g., a computing device and an access device). The protocol disclosed herein conforms to the limitations of data on sound technology (e.g., half duplex, difficulty in maintaining session, low bandwidth, long latency to switch between sending and receiving, etc.) while enabling a payment transaction to be performed in a secure manner. The techniques described herein enable a stateless and session-less secure payment protocol for sound. Stated differently, a continuous session and an exchange of states in the session, between a computing device and an access device, is not needed in embodiments of the invention so that the secure transfer of data by sound can occur between the access device and the computing device.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method for performing a transaction, comprising:
receiving, by a server computer from a computing device, first data comprising at least a unique identifier associated with an access device in a transaction;
verifying, by the server computer, the first data utilizing the received unique identifier;
generating a session key;
generating encrypted data utilizing the session key;
transmitting second data comprising the encrypted data to the computing device;
receiving, from the access device, third data comprising the encrypted data;
generating decrypted data utilizing the encrypted data and the session key;
verifying the decrypted data; and
in response to verifying the decrypted data, transmitting an authorization request message for the transaction comprising at least some portion of the third data and the decrypted data,
wherein transmitting the second data comprising the encrypted data to the computing device causes the computing device to transmit, to the access device, sound data comprising at least the encrypted data, and wherein receiving, by the access device, the sound data causes the access device to transmit the third data comprising the encrypted data.

2. The method of claim 1, further comprising:
generating the unique identifier associated with the access device during a registration process performed with the access device;
maintaining a mapping between the unique identifier and a terminal ID of the access device; and
transmitting the unique identifier to the access device.

3. The method of claim 2, wherein the unique identifier associated with the access device is associated with an expiration date and/or an expiration time, and is invalid after the expiration date and/or expiration time.

4. The method of claim 1, wherein before receiving the first data from the computing device, the unique identifier was received by the computing device from the access device as sound.

5. The method of claim 1, wherein the encrypted data comprises an encrypted token.

6. The method of claim 1, wherein the third data comprises the unique identifier.

7. The method of claim 1, wherein the session key is a symmetric key.

8. The method of claim 1, wherein verifying, by the server computer, the first data utilizing the received unique identifier, comprises verifying that the received unique identifier is the same as a unique identifier previously generated by the server computer and transmitted to the access device.

9. A server computer comprising:
a processor; and
a computer readable medium coupled to the processor, the computer readable medium comprising code, executable by the processor, to implement a method comprising
receiving, from a computing device, first data comprising at least a unique identifier associated with an access device for a transaction,
verifying the first data utilizing the received unique identifier,
generating a session key,
generating encrypted data utilizing the session key,
transmitting second data comprising the encrypted data to the computing device,
receiving, from the access device, third data comprising the encrypted data,
generating decrypted data utilizing the encrypted data and the session key,
verifying the decrypted data, and
in response to verifying the decrypted data, transmitting an authorization request message for the transaction comprising at least some portion of the third data and the decrypted data, wherein transmitting the second data comprising the encrypted data to the computing device causes the computing device to transmit, to the access device, sound data comprising at least the encrypted data, and wherein receiving, by the access device, the sound data causes the access device to transmit the third data comprising the encrypted data.

10. The server computer of claim 9, wherein the server computer is a service provider computer.

11. The server computer of claim 9, wherein the session key is an AES session key.

12. The server computer of claim 9, wherein the method further comprises, in response to verifying, generating a token request message comprising a credential of a user of the computing device and transmitting the token request message to a token provider computer.

13. The server computer of claim 12, wherein the method further comprises:
receiving token response message comprising a token and a cryptogram corresponding to the token from the token provider computer.

14. A method comprising:
receiving, by a server computer from a computing device, first data comprising at least a unique identifier associated with an access device, the first data being associated with a transaction being conducted between the computing device and the access device;
verifying, by the server computer, the first data utilizing the unique identifier received;
in response to verifying the first data, transmitting second data comprising encrypted data to the computing device, wherein receipt of the second data by the computing device causes the computing device to transmit the second data to the access device;
receiving, from the access device, third data comprising the encrypted data;
verifying the third data comprising the encrypted data at the server computer; and
when the third data comprising the encrypted data is verified, transmitting, by the server computer, an authorization request message for the transaction,
wherein transmitting the second data comprising the encrypted data to the computing device causes the computing device to transmit, to the access device, sound data comprising at least the encrypted data, and wherein receiving, by the access device, the sound data causes the access device to transmit the third data comprising the encrypted data.

15. The method of claim 14, wherein the first data further comprises one or more of: user verification data associated with a user of the computing device, device data associated with the computing device, an entity identifier associated with the access device, and/or an amount.

16. The method of claim 14, wherein the second data comprises at least one of: a token, an amount, or a portion of an account identifier.

17. The method of claim 14, wherein the unique identifier associated with the access device is received by the computing device utilizing sound transmitted by the access device.

18. The method of claim 14, wherein the third data comprises the unique identifier, which is a beacon ID, and an encrypted token.

19. The method of claim 18, wherein the method further comprises:
decrypting the encrypted token to obtain a token, and wherein the authorization request message comprises the token.

* * * * *